March 7, 1944.  T. BACKUS  2,343,733
COMBINED TRANSMISSION AND AUXILIARY
Filed Sept. 17, 1942
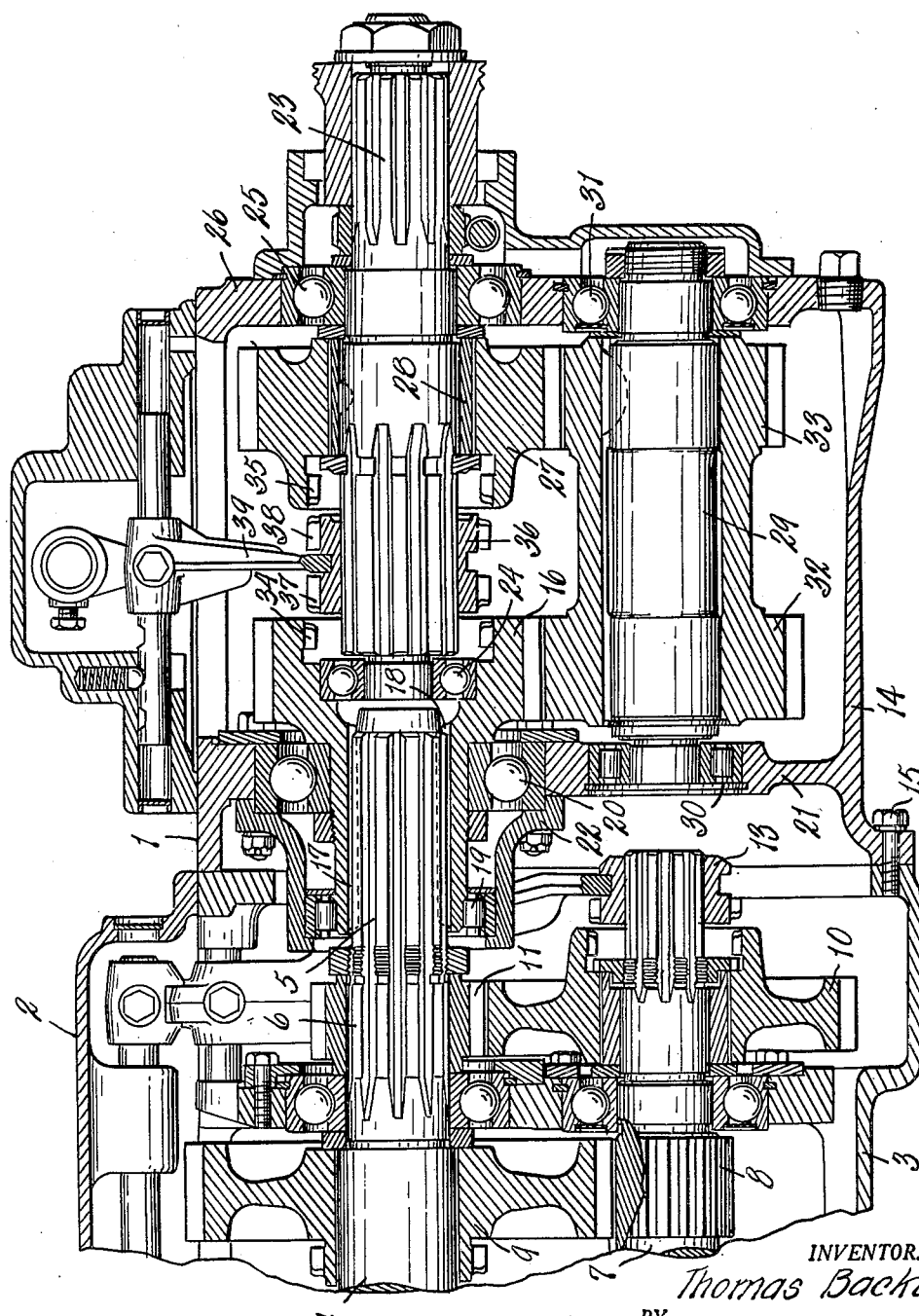
INVENTOR.
Thomas Backus
BY Earl + Chappell Patented Mar. 7, 1944

2,343,733

UNITED STATES PATENT OFFICE 2,343,733

COMBINED TRANSMISSION AND AUXILIARY

Thomas Backus, Kalamazoo, Mich., assignor to Fuller Manufacturing Company, Kalamazoo, Mich.

Application September 17, 1942, Serial No. 458,667

2 Claims. (Cl. 74—338)

This invention relates to improvements in combined transmission and auxiliary.

This invention relates to transmissions and particularly to auxiliary transmissions adapted to be attached to a main transmission to provide additional gear ratios. Heretofore such transmissions have consisted of a gear splined to receive the output shaft of a main transmission and supported thereon, a main shaft, a countershaft, gearing on the main shaft and the countershaft, said splined gear meshing with a gear on the countershaft, and clutch means to provide a direct drive or a drive through the countershaft and the gearing. In such an arrangement, when driving through the gears, radial loads, as well as driving torque are imposed upon the splined gear and the output shaft of the main transmission, causing the splined connection to pound out and resulting in misalignment and loose fit of these units. Such auxiliary transmissions have also been undesirable because of said splined gear being supported by and connected to the output shaft of the main transmission instead of being supported by the casing of the auxiliary transmission, said gear can not be telescopically slid from said shaft and removed as a unit with the auxiliary transmission for servicing and because the splines connecting the main transmission output shaft and the corresponding gear of the auxiliary pound out and thus cause misalignment of the gear with its cooperating gears in the auxiliary.

The objects of this invention are:

First, to provide a new and improved auxiliary transmission.

Second, to provide such a transmission which obviates the above difficulties.

Third, to provide such a transmission which is a complete unit which can be removed from the main transmission and serviced on a bench.

Fourth, to provide such a transmission which does not have spline fits for heavy support and in which the gear which is splined to the main transmission output shaft is supported in its casing and is held in line with suitable bearing means.

Fifth, to provide such a transmission wherein the splined gear is supported for axial alignment and rotation within the auxiliary transmission casing and in such manner that all radial and tilting loads are absorbed by the bearings therefor in said casing, the splined connection between the output shaft of the main transmission and the gear merely transmitting driving torque, thus relieving all radial and tilting loads from the splined connection.

Sixth, to provide such an auxiliary transmission as a complete and self-contained unit assembled to a main transmission merely by telescopically sliding a splined gear supported by the auxiliary transmission casing over the output shaft of the main transmission and fastening said casing to the main transmission.

Other objects and advantages pertaining to details and economies will appear from the description to follow. A preferred embodiment of the invention is illustrated in the accompanying drawing, in which:

The single figure of the drawing is a sectional view through an auxiliary transmission embodying my invention and through the rear end of a main transmission.

My auxiliary transmission is indicated generally at 1 and the main transmission to which it is fixed is indicated generally at 2.

The main transmission comprises a casing 3 with a main or output shaft 4 whose end 5 extends from the casing and is provided with splines 6. The main transmission likewise has a countershaft 7 and suitable gearing 8 and 9. It also has over-drive gears 10 and 11 and clutch means 13 which form no part of the present invention.

The auxiliary transmission comprises a casing 14 which is adapted to fit over and enclose the projecting end 5 of the output shaft 4 of the main transmission and which is secured to the main transmission with cap screws indicated at 15.

The auxiliary transmission has a stem gear 16 having a bore 17 fitted over the end 5 of the output shaft 4 of the main transmission. The bore 17 is provided with splines 18 to cooperate with the splines 6 to provide a driving connection between the shaft 4 and the gear 16. The gear 16 is mounted in line with the shaft 4 and is supported for rotation and against tilting in roller bearing 19 and ball bearing 20, both of which are supported by the casing 14 through the medium of the partition 21 and the extension cap member 22.

In line with the gear 16 is a main shaft 23 which is supported for rotation in a pilot bearing 24 in gear 16 and bearing 25 in the end wall 26 of the casing 14. Main shaft gear 27 is rotatably mounted on the main shaft 23 on bushing 28.

A countershaft 29 is mounted in bearings 30 and 31 in the casing 14. It is provided with fixed gears 32 and 33 which mesh respectively with the gears 16 and 27.

The gear 16 is provided with clutch teeth 34 and the gear 27 is provided with clutch teeth 35. Between the gears 16 and 27 is a shiftable clutch member 36 splined to the main shaft and shiftable longitudinally thereon. The clutch member has teeth 37 and 38 adapted to selectively engage the clutch teeth 34 and 35. Shifter 39 is provided to shift the clutch member 36.

The clutch member 36 is shown in neutral position in the drawing. When it is shifted to the left as viewed in the drawing, a direct drive is established between shaft 4 and shaft 23 through gear 16, clutch teeth 34 and 37 and the clutch member 36. When the shifter is moved to the right as viewed in the drawing, the drive is from shaft 4 to gear 16 to gear 32 to gear 33 to gear 27 and thence to shaft 23 through teeth 35 and 38 and the clutch member 36.

With my auxiliary transmission, the gear 16 is supported in the bearings 19 and 20 and there is thus no reliance placed on a spline fit for a bearing support. Thus misalignment of gear 16 due to pounding out of splines 6 and 18 is eliminated. The gear 16 is supported from the casing 14 and it is therefore possible to remove the auxiliary transmission as a unit for bench servicing and it is thus not necessary to disassemble it for removal.

The terms and expressions which have been herein employed are used as terms of description and not of limitation, and there is no intention, in the use of such terms and expressions, of excluding any equivalents of the features shown and described, or portions thereof. It is recognized that various modifications are possible within the scope of the invention claimed.

Having thus described my invention, what I claim as new and desire to secure by Letters Patent is:

1. The combination with a main transmission including a housing having an opening at the rear end thereof and a splined main transmission output shaft extending into said opening, of an auxiliary transmission unit comprising a housing detachably mountable on said main transmission shaft and constituting a closure for said opening, a stem gear projecting into said opening and having a splined bore receiving said splined main transmission output shaft, a tubular bearing support member carried by said auxiliary transmission shaft housing and surrounding the forward end of the stem portion of said stem gear projecting into said main housing opening and concentrically embracing the splined end of said main transmission output shaft, a bearing for the forward end of said stem gear carried by said bearing support, a second bearing for said stem gear carried by said auxiliary transmission shaft housing and disposed adjacent the gear thereof, an auxiliary transmission output shaft alined with said output shaft of said main transmission, a bearing for the forward end of said auxiliary transmission output shaft disposed within said stem gear, a second bearing for said auxiliary transmission output shaft carried by said auxiliary transmission shaft housing, a gear on said auxiliary transmission output shaft, said stem gear and said gear on said auxiliary transmission output shaft being provided with facing clutch elements, a clutch member splined to said auxiliary transmission output shaft and selectively engageable with said clutch elements, and a countershaft having gears rotatable therewith meshing with said stem gear and said gear on said auxiliary transmission output shaft, said stem gear and bearing support member constituting an assembled part of the auxiliary transmission unit for connection to and removable from said main transmission shaft housing.

2. An auxiliary transmission unit adapted to be attached to or detached as an assembled unit from a main transmission unit including a housing having an opening at the rear end thereof and a splined main transmission output shaft extending into said opening, said auxiliary transmission unit comprising a housing constituting a closure for the opening of the main transmission housing, a stem gear having a splined bore telescopingly engageable with a splined main transmission output shaft, a forwardly projecting bearing support carried by said auxiliary transmission shaft housing and removable therewith and embracing the forward end of the stem portion of the stem gear and the splined end of the main transmission output shaft with which the stem gear is in engagement, a bearing for the outer end of said stem gear carried by said bearing support, a second bearing for said stem gear carried by said auxiliary transmission shaft housing, the stem gear and bearing support member constituting an assembled part of the auxiliary transmission unit for connection to and removal from said main transmission shaft housing, an auxiliary transmission output shaft alined with said output shaft of said main transmission, a bearing for the forward end of said auxiliary transmission output shaft carried by said stem gear, a second bearing for said auxiliary transmission output shaft carried by said auxiliary transmission shaft housing, a gear on said auxiliary transmission output shaft, said stem gear and said gear on said auxiliary transmission output shaft being provided with clutch elements, a clutch member splined to said auxiliary transmission output shaft and selectively engageable with said clutch element on said stem gear and the gear on said auxiliary transmission output shaft, and a countershaft having gears rotatable therewith meshing with said stem gear and said gear on said auxiliary transmission output shaft.

THOMAS BACKUS.